UNITED STATES PATENT OFFICE.

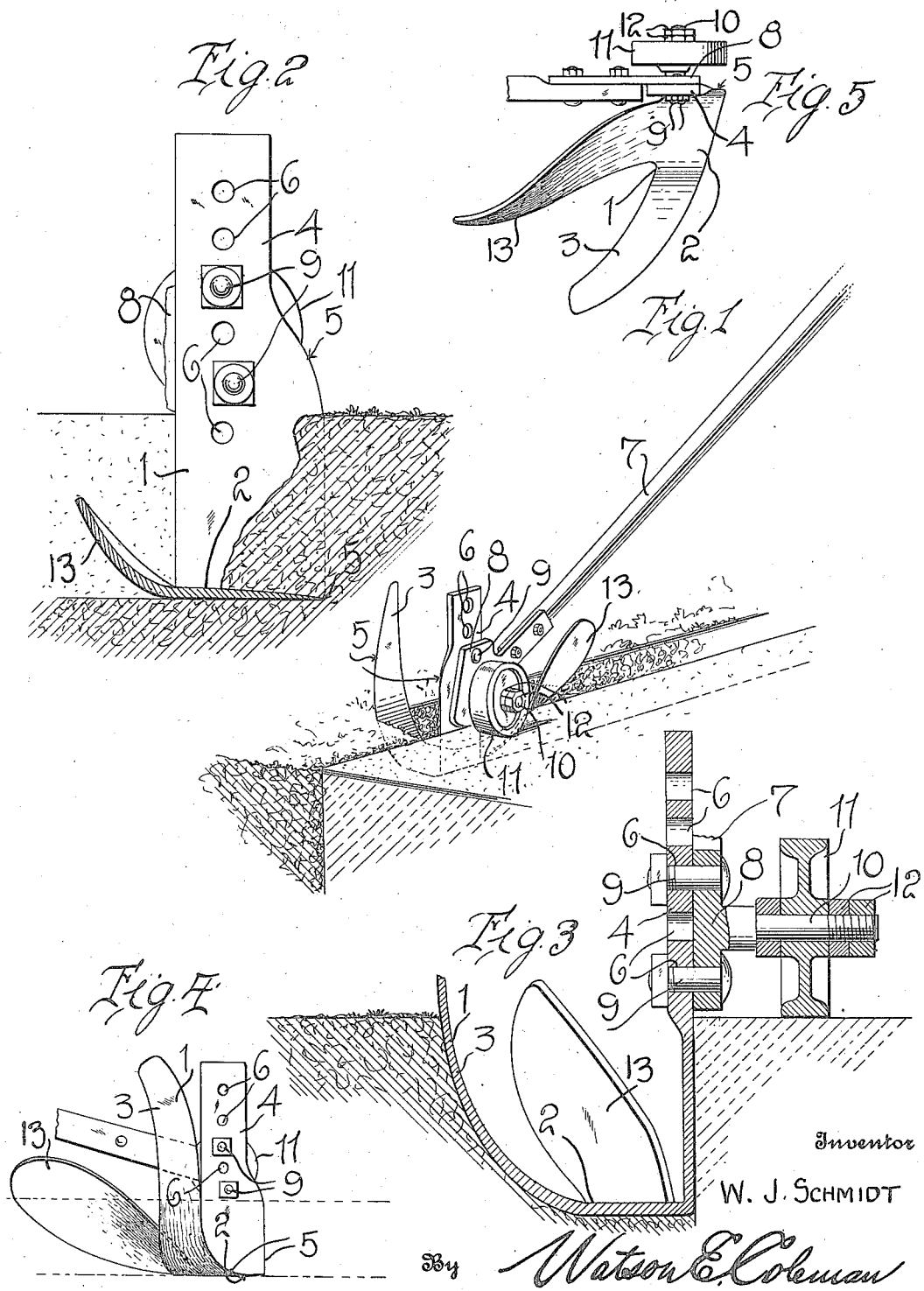

WILLIAM J. SCHMIDT, OF GARNER, IOWA.

TRENCH-CUTTER AND EDGE-TRIMMER.

1,157,809.  Specification of Letters Patent.  Patented Oct. 26, 1915.

Application filed May 12, 1915. Serial No. 27,704.

*To all whom it may concern:*

Be it known that I, WILLIAM J. SCHMIDT, a citizen of the United States, residing at Garner, in the county of Hancock and State of Iowa, have invented certain new and useful Improvements in Trench-Cutters and Edge-Trimmers, of which the following is a specification, reference being had to the accompanying drawings.

My invention relates to devices adapted to be used in the care of lawns and grass plots and particularly to a device adapted to neatly cut or trim the sod immediately adjacent to a sidewalk or to the border of a flower bed or in other like circumstances.

The object of my invention is the provision of a very simple implement of the character described adapted to cut a shallow trench and trim the sod immediately adjacent said trench, the device being so constructed that the cutting blade may be raised or lowered relative to the supporting wheel.

A further object in this connection is to provide a mold board mounted upon the implement whereby the material cut from the trench may be carried rearward and lifted to one side.

Other objects will appear in the course of the following description.

My invention is illustrated in the accompanying drawings wherein—

Figure 1 is a perspective view of my improved implement; Fig. 2 is a side elevation partly broken away, the blade being in section; Fig. 3 is a vertical section through the blade, the supporting head, and the wheel; Fig. 4 is a side elevation; Fig. 5 is a plan view.

Referring to these drawings it will be seen that my improved device comprises a cutting member 1 which is U-shaped to provide upstanding divergent legs 3 and 4 and a transverse web 2. The cutting blade is formed with a knife edge 5. This knife edge extends entirely up the leg 3 but only partly up the leg 4. The forward edge of the leg 3 is inclined upward and rearward and the upper end of the leg 4 is contracted in width. The leg 4 is provided with a plurality of bolt openings 6.

In order to provide for the support of the cutting member I mount upon the handle 7 in any suitable manner the head 8. This head is flat on its inner face and adapted to bear against the outer face of the leg 4 and is provided with a pair of stud bolts 9, these bolts being adapted to pass through any one of the perforations 6. Projecting outward from the head 8 is a stub 10 which is reduced for insertion through a supporting wheel 11. The supporting wheel is detachably held upon the stub by means of locking nuts 12.

It will be noted that the perforations 6 are arranged in a vertical series and so disposed with relation to each other that the bolts 9 may pass through the perforations 6 in any vertical adjustment of the blade and will hold the blade rigidly in position upon the head. Mounted upon the transverse portion of the cutting member 2 and extending rearward therefrom is a share 13. This share extends rearward and is turned so as to discharge the material cut by the cutting member away from the wheel 11.

It will be seen from the plan view Fig. 5 that the cutting edge of web 2 is inclined rearward and outward, so as to give a shear cut.

The operation of my device will be obvious from what has gone before. When it is desired to trim a border and cut a trench, the wheel is disposed upon the raised portion of the border or upon the edge of a sidewalk and then the implement is forced into the ground and pushed forward. As it is pushed forward it will cut a U-shaped trench adjacent the sidewalk or that portion of the border upon which the wheel 11 rides and at the same time will trim away the grass or sod adjacent the portion upon which the wheel rides. I have found by experience that by forming the leg 3 of the cutting blade with an upwardly and rearwardly extending cutting edge that a much more effective cutting action is secured than if the cutting edge is inclined forward and upward. By reason of the adjustability of the blade it is possible to cut either relatively deep trenches or relatively shallow trenches and also to so incline the blade with relation to the handle that the best cutting action may be secured. The mold board is preferably integral with the blade and carries the sod out of the trench and deposits it to one side thereof, thus obviating the necessity of cleaning out the cut trench.

Having thus described my invention what I claim is:

In an implement of the character described, a handle having a head at one end, said head being flat upon its inner face and having a stub axle projecting from its outer face, a wheel detachably mounted upon the stub axle and an approximately U-shaped blade adjustably mounted upon the head, the inner end of said blade extending vertically upward and being flat to bear against the flat face of the head and being formed with a plurality of perforations, bolts passing through the perforations and through the head and detachably engaging the blade with the head for vertical adjustment, the outer leg of said blade having an upwardly and a rearwardly extending cutting edge, the lower end of said outer leg being disposed rearward of the cutting edge on the other leg, the web connecting said legs having a rearwardly inclined cutting edge and an integral share extending rearward from the web connecting the legs and being deflected into a vertical plane and toward the plane of the outer leg of the cutting blade.

In testimony whereof I hereunto affix my signature in the presence of two witnesses.

WILLIAM J. SCHMIDT.

Witnesses:
J. E. WICHMAN,
J. C. HASTINGS.